United States Patent Office 3,541,762
Patented Nov. 24, 1970

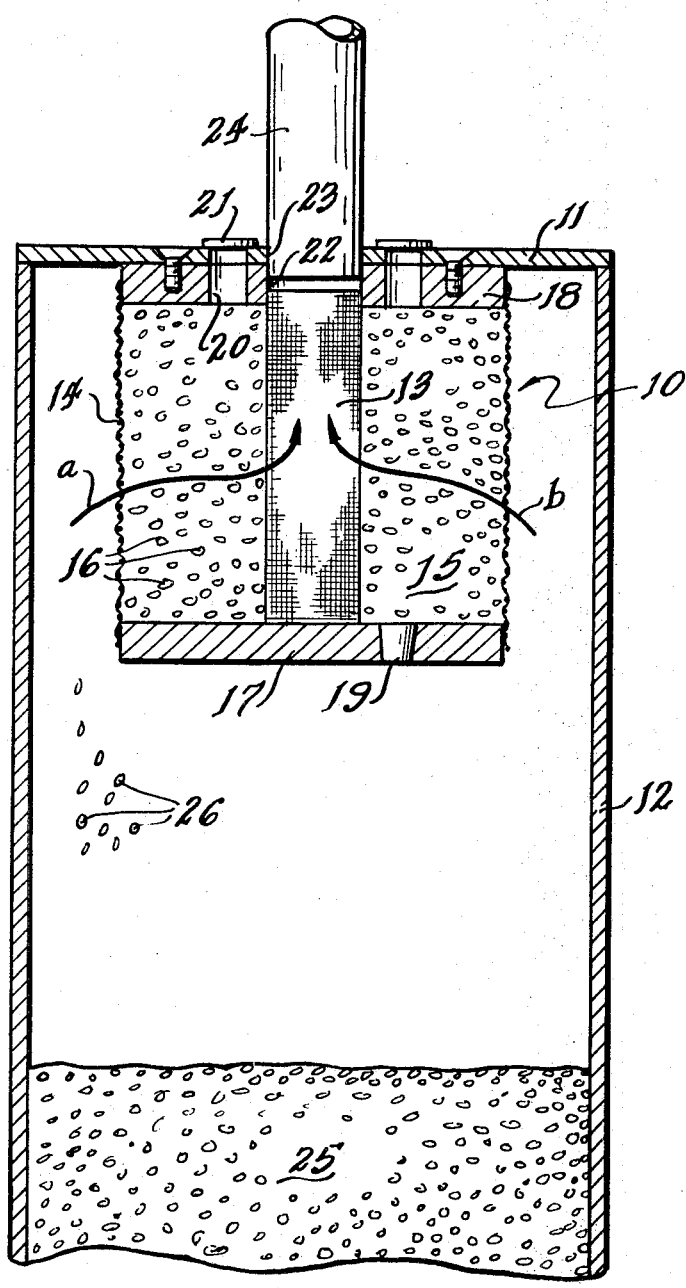
Inventors
Devabaktuni Ramaswami
Albert A. Jonke
Norman M. Levitz
Attorney

3,541,762
ANNULAR PACKED-BED FILTER
Devabaktuni Ramaswami, Hinsdale, Albert A. Jonke, Elmhurst, and Norman M. Levitz, Bellwood, Ill., assignors to the United States of America as represented by the United States Atomic Energy Commission
Filed Mar. 18, 1969, Ser. No. 808,120
Int. Cl. B01d 46/04
U.S. Cl. 55—96                                     1 Claim

ABSTRACT OF THE DISCLOSURE

Concentric cylindrical screens form an annulus which contains filter material. Gas is passed transversely through the filter material from the outer screen and exits axially upward through the inner screen.

CONTRACTUAL ORIGIN OF THE INVENTION

The invention described herein was made in the course of, or under, a contract with the United States Atomic Energy Commission.

BACKGROUND OF THE INVENTION

This invention relates to gas filtration and, in particular, to filtration of the off-gas from a fluidized bed.

In one method of reprocessing nuclear fuels, the irradiated fuel is converted to various fluorides in a fluidized bed by reaction with fluorine or fluorine interhalogens. The off-gas from the fluidized bed generally contains some entrained particulate matter which must be filtered from the off-gas and preferably returned to the fluidized bed. Both down-flow packed-bed and sintered-metal filters are commonly used in conjunction with fluidized beds.

A down-flow packed-bed filter usually consists of granular inert material placed downstream from the fluidized bed with the off-gas flowing into the top of the filter and downwardly therethrough to exit from the bottom. Because the down-flow packed-bed filters use inert filter material, they are operable in high temperatures and in corrosive environments. The chief drawback to the use of down-flow packed-bed filters is that the filtered material cannot be readily returned to the fluidized bed for further processing. Since this filtered material contains significant amounts of fissionable material, it cannot be rejected to waste; hence, down-flow packed-bed filters are generally useful only in those processes in which the off-gas contains low concentrations of particulate matter.

Sintered-metal filters are relatively thin, perforate metal sheets. They have successfully been used in fluidized bed reprocessing of low enriched uranium dioxide fuels. Since most of the filtered material is easily returned to the fluidized bed by blowback, that is reversing the flow of gas through the filter, sintered metal filters may be used where the off-gas contains both low and high concentrations of particulate matter. The problem with sintered-metal filters is their reactivity in a corrosive environment at high temperature where the perforations in the sintered metal provide numerous areas for corrosion. Where the reprocessing scheme is similar to that described in U.S. patent application, Ser. No. 770,145, assigned to the United States Atomic Energy Commission, both high temperatures, in the range of between about 400° C. and about 600° C., and a corrosive environment, such as fluorine gas or fluorine-oxygen mixtures, are present and the off-gas contains a large amount of particulate matter. Heretofore, a filter has not been available which will retain its physical integrity in a hot corrosive environment while at the same time provide for easy return of the trapped particulate matter to the fluidized bed.

SUMMARY OF THE INVENTION

The present invention entails passing an off-gas containing particulate matter from a fluidized bed transversely through the larger of two concentric perforate hollow cylinders which contain inert filter material therebetween. The purified off-gas which enters the innermost perforate cylinder passes at accelerated speeds axially upward through the inner cylinder.

BRIEF DESCRIPTION OF THE DRAWINGS

The single figure is a cross-sectional view of this invention.

DETAILED DESCRIPTION OF THE PREFERRED EMBODIMENT

With reference to the drawing, annular filter 10 abuts cover 11 of fluid-bed reactor 12 and comprises inner and outer perforate hollow cylinders 13 and 14 respectively. An annulus 15 formed therebetween contains inert filter material 16. Filter 10 is closed at the ends by means of bottom plate 17 and top plate 18. Bottom plate 17 is imperforate except for plug 19 which provides means for dumping filter material 16 from annulus 15. Top plate 18 has a plurality of ports 20 in communication with annulus 15, in registry with caps 21 in cover 11, for admitting filter material 16 into annulus 15. A central aperture 22 in top plate 18, in registry with an off-gas exit 23 in cover 11, provides a connection between inner cylinder 13 and an overhead pipe 24. Filter 10 is spaced from a fluidized bed 25 but particulate matter 26 is carried with the off-gas from the bed through the filter along paths *a* and *b*.

The off-gas as it passes along paths *a* and *b* increases in velocity because an equilibrium exists between the amount of gas entering filter 10 through cylinder 14 and the amount of gas leaving the filter through cylinder 13 while the surface area of cylinder 13 is less than that of cylinder 14. The decrease in surface area is compensated for by an increase in velocity of the off-gas as it passes through filter 10. Increased velocity is important because filtering with inert material such as alumina is by impaction and, generally, the higher the velocity the more efficient the filtration. The particulate matter 26 is trapped both on the outside surface of outer cylinder 14 and on the inert filter material 16. Blowback through filter 10 returns the particulate matter 26 trapped on the outside of cylinder 14 but the patriculate matter trapped on the inert filter material 16 can be returned to bed 25 only by means of plug 19. Usually the inert filter material 16 is the same as the inert material in the bed 25 so dumping will not adversely affect the fluidized bed. Proper correlation of the filter material 16 and the width of annulus 15 will prevent caking of particulate matter 26 on inner cylinder 13 where it is difficult to remove by either blowback or dumping. This is an important consideration where the particulate matter 26 must be recovered for economic reasons.

The following experiments show some of the advantages of an annular filter as compared to a down-flow packed-bed filter. In these experiments the annular filter was constructed from 50 mesh stainless steel screen (31.3 percent open area) with the inner cylinder having a 1-inch diameter and the outer cylinder having a 4-inch diameter. Two different batches of alumina were used as inert filter material: one batch ranged in size from −28 to +48 mesh and the other from −48 to +100 mesh. The equipment consisted of a transparent (Lucite) fluid-bed column 2 inches in diameter and 24 inches high. Both the down-flow packed-bed filter and the annular filter were 4 inches in diameter and about 6 inches in height; they were filled with alumina filter material sized as stated above. However, the annular filter had an inner cylinder one inch in diameter so the filter material was only 1½ inches wide at any point. The charge to the fluid bed consisted of −48+100 mesh alumina and −500 mesh nickel fines with particle size for the nickel from 6 to 22 microns. Both filters were almost 100 percent efficient as filters since a downstream absolute filter showed an almost immeasurable amount of nickel fines. Because the 1½ inches of alumina in the annular filter essentially completely filtered the particle-containing gas, the inner cylinder 13 did not act as a filter and only an insignificant amount of fines collected thereon. Table I reports data for the down-flow packed-bed filter and Table II reports data for the annular packed-bed filter.

TABLE I

[Fluid-bed charge: 160 g. of −500 mesh nickel fines; 400 g. of −48+100 mesh alumina]

| | Run No. 1 | Run No. 2 |
|---|---|---|
| Filter dia. (in.) | 4 | 4 |
| Alumina, mesh size | −48+100 | −28+48 |
| Superficial gas velocity through filter (ft./sec.) | 0.259 | 0.259 |
| Gas throughput (c.f.m. per sq./ft. of filter area) | 15.2 | 15.2 |
| Pressure drop min.-max. (in. of H₂O) | 16–22.4 | 8–10.2 |
| Total loading of nickel fines on filter, g | 72.0 | 81.7 |
| Average loading of nickel fines on the filter, kg./sq. ft. | 0.83 | 0.936 |
| Depth of penetration of nickel fines (in.), visible | ½ | <½ |
| Depth of penetration of nickel fines (in.), measured | 1 | 1 |

TABLE II

[Charge to the fluid-bed column: Alumina 2.0 kg. of −48+100 mesh; nickel fines 0.8 kg. of −500 mesh]

| | Run No. 3 | Run No. 4 |
|---|---|---|
| Superficial velocity through the fluid-bed column (ft./sec.) | 0.69 | 0.69 |
| Alumina charge to annulus filter: | | |
| Mesh size | −28+48 | −48+100 |
| Mass, kg | 1.715 | 1.8 |
| Total gas flow rate through the filter, s.c.f.m. | 2.02 | 2.02 |
| Gas throughput for the filter, s.c.f.m./sq. ft. | 11.6 | 11.6 |
| Run duration, hr | 5.25 | 5.83 |
| Mass of nickel fines collected on the filter, g | 218.4 | 172 |
| Average loading of nickel fines on the filter, kg./sq. ft. | 1.26 | 0.99 |
| Mass of nickel fines collected in the filter, g | 41.1 | 48.7 |
| Mass of nickel fines penetrating the filter, mg | ~1.0 | ~1.0 |
| Pressure drop for flow of gases through the filter, inches of water | 1.4–2.0 | 2.5–3.8 |

A comparison of Runs 1 and 4 and of Runs 2 and 3 shows the advantages of an annular packed-bed filter in two of the most important characteristics: average loading on the filter and pressure drop across the filter. As expected, the smaller the filter material the larger the pressure drop, but for Runs 2 and 3 the annular filter showed a 500% lower pressure drop than the down-flow packed-bed filter and for Runs 1 and 4 the annular filter had a 60% lower pressure drop. Additionally, the annular filter uses less alumina filter material although the filtering action is equivalent to the down-flow packed-bed filter.

Further experiments were performed to determine the required width of annulus 15. Using the same apparatus as described above and alumina in the annular filter from −48 to +100 mesh, it was found that a 1-inch width of filter material resulted in essentially complete filtration. For alumina filter material −28 to +48 mesh, a width of 1½ inches of filter material was required. These relationships between annulus width and the particle size of the filter material are critical in order to prevent inner cylinder 13 from acting as a filter and collecting particulate matter on its surface. A cake built up on cylinder 13 is difficult to remove and undesirable; hence, the annulus formed between cylinders 13 and 14 must be wide enough, dependent upon the type of filter material contained therein, to provide for essentially complete filtration by the filter material.

It will be understood that the invention is not to be limited to the details given herein but that it may be modified within the scope of the appended claim.

The embodiments of the invention in which an exclusive property or privilege is claimed are defined as follows:

1. A method of filtering an off-gas produced by passing a fluorine-containing gas upwardly through a fluidized bed containing alumina as inert material and uranium and plutonium values, said bed being maintained between about 400° C. and about 600° C. comprising passing said off-gas transversely through the outer of inner and outer 50 mesh screens formed into concentric cylinders separated between one and one and one-half inches, the space therebetween being packed with −28 to +100 mesh alumina, and containing −28 to +100 mesh alumina therebetween, passing the filtered off-gas axially upward after it passes through the inner cylindrical screen, periodically reversing the flow of gas through the inner and outer concentric screens to return any filtered material caked on the outer screen to the fluidized bed and periodically dumping the alumina contained between the inner and outer screens into the fluidized bed.

References Cited

UNITED STATES PATENTS

| | | | |
|---|---|---|---|
| 2,214,737 | 9/1940 | Dauphinee | 55—517 |
| 2,928,495 | 3/1960 | Sweet | 55—517 |
| 3,067,560 | 12/1962 | Parker | 55—387 |
| 3,164,440 | 1/1965 | Levey | 23—353 |
| 3,186,149 | 6/1965 | Ayers | 55—484 |
| 3,296,775 | 1/1967 | Squires | 55—387 |
| 3,410,055 | 11/1968 | Zenz | 55—517 |
| 3,429,669 | 2/1969 | Camozzo et al. | 23—352 |
| 2,746,561 | 5/1956 | Beber et al. | 55—302 |

FRANK W. LUTTER, Primary Examiner

B. NOZICK, Assistant Examiner

U.S. Cl. X.R.

23—352, 353; 55—98, 432, 517